(12) United States Patent
Vankka

(10) Patent No.: US 6,693,970 B2
(45) Date of Patent: Feb. 17, 2004

(54) QAM MODULATOR

(75) Inventor: Jouko Vankka, Helsinki (FI)

(73) Assignee: Nokia Corporation, Espoo (FI)

( * ) Notice: Subject to any disclaimer, the term of this patent is extended or adjusted under 35 U.S.C. 154(b) by 133 days.

(21) Appl. No.: 09/978,981

(22) Filed: Oct. 15, 2001

(65) Prior Publication Data

US 2003/0206600 A1 Nov. 6, 2003

Related U.S. Application Data

(63) Continuation of application No. PCT/FI99/00335, filed on Apr. 23, 1999.

(51) Int. Cl.$^7$ .............................. H04L 32/02; H04L 5/12
(52) U.S. Cl. ......................... 375/261; 375/298; 455/45; 332/103
(58) Field of Search ................................. 375/261, 298, 375/296, 297; 455/17, 45, 104, 108; 712/7; 332/103–105

(56) References Cited

U.S. PATENT DOCUMENTS

| | | | |
|---|---|---|---|
| 4,646,173 A | | 2/1987 | Kammeyer et al. |
| 4,896,287 A | * | 1/1990 | O'Donnell et al. ......... 708/622 |
| 4,910,698 A | * | 3/1990 | McCartney ................. 708/276 |
| 4,945,505 A | * | 7/1990 | Wiener et al. .............. 708/204 |
| 5,230,011 A | | 7/1993 | Gielis et al. |
| 5,317,753 A | * | 5/1994 | Kuenemund et al. .......... 712/7 |
| 5,737,253 A | * | 4/1998 | Madisetti et al. ........... 708/276 |
| 5,889,822 A | | 3/1999 | Van De Plassche et al. |
| 5,937,011 A | * | 8/1999 | Carney et al. .............. 375/297 |
| 6,463,081 B1 | * | 10/2002 | Chen et al. ................. 370/532 |

FOREIGN PATENT DOCUMENTS

EP 0741478 A2 11/1996

OTHER PUBLICATIONS

Transactions On Electronic Computers, vol. EC–8, No 3, Sep. 1959, Jack E. Volder, "The Cordic Trigonometric Computing Technique", p. 330 –p. 334.
ISCAS 98, Vol 4, May 1998, Seunghyeon Nahm et al, "A Cordic–Based Digital Quadrature Mixer: Comparison With A ROM–Based Architecture", p. 385 –p. 388.

* cited by examiner

Primary Examiner—Phoung Phu
(74) Attorney, Agent, or Firm—Squire, Sanders & Dempsey L.L.P.

(57) ABSTRACT

Known digital QAM modulators use sine/cosine memories and a plurality of multipliers. This can be avoided by replacing the circuitry which carries out the circular rotation of [I(n), Q(n)]T performed in all the QAM modulators, with a CORDIC algorithm. The invented QAM modulator is comprised of a plurality of digital rotation stages (72, 73 . . . 74) coupled in sequence. The first stage (72) receives the $I_{IN}$ and $Q_{IN}$ data streams and the last stage (74) outputs a vector comprising of the orthogonal I and Q components of a digital intermediate frequency signal. Each of the rotation stages rotates an input vector applied to the stage at a predetermined elementary rotation angle, said input vector being the output vector of the previous digital rotation stage. The modulator further includes an angle computation block (710) for counting the elementary rotation angles for the rotation stages. The angle computation block is connected to the phase accumulator which receives a frequency control word ($F_x$) and based on that word generates an input word ($Z_{IN}$) applied to the angle computation block.

11 Claims, 11 Drawing Sheets

FIG. 1 *prior art*

| ADJACENT CHANNEL | -55 dBc/4.096 MHz OR LESS |
| --- | --- |
| NEXT NEIGHBORING CHANNEL | -60 dBc/4.096 MHz OR LESS |
| MODULATION | DUAL CHANNEL QPSK |
| CARRIER SPACING | 5 MHz |
| NUMBER OF CARRIERS | 4 |
| EVM AT DIGITAL OUTPUT | 5 % R.M.S. OR LESS |
| FREQUENCY ERROR | 0.02 ppm x 2GHz ≈40 Hz |
| SYMBOL RATE F0 I AND Q DATA | 4.096 Mps |
| INPUT WORD LENGTH | 12 b |

US 6,693,970 B2

QAM MODULATOR

This application is a continuation of PCT/FI99/00335, filed Apr. 23, 1999.

FIELD OF THE INVENTION

The present invention generally relates to a modulator for modulating a carrier in a code division multiple access system, and particularly to a multicarrier quadrature amplitude modulator.

BACKGROUND OF THE INVENTION

Over the past several years, code-division multiple access (CDMA) systems have gained widespread interest in the mobile wireless communications. A wide band code division multiple access (WCDMA) uses a wider channel compared to a narrow band CDMA channel which improves frequency diversity effects and therefore reduce the fading problems. Due to resistance to multipath fading and other advantages such as increased capacity and soft-handoff, the WCDMA was selected by European Telecommunications Standars Institute (ETSI) for wide band wireless access to support third-generation mobile services. This technology is optimized to allow very high-speed multimedia services such as full-motion video, internet access and video conferencing.

In a WCDMA system one or more carriers may be used. In the above mentioned European WCDMA system, four QAM modulated carrier frequencies are needed to generate in a base station. A straightforward solution is to modulate separately each of the carriers whereupon the carriers are combined before feeding to an antenna. In a consequence of this, the number of processing branches is equal to the number of carriers.

FIG. 1 depicts a prior art multicarrier transmitter for generating four modulated carriers. Each carrier is processed separately in an own branch. All the branches are similar so that operation of the upper branch will be described only. Modulating digital I and Q base band signals are produced in an digital base band I-Q modulator 11 which is well known in the art. Then, each of the digital signals is separately converted to an analog signal with DA converters 12 and 14, the outputs signals of which being applied to low pass filters 13 and 15. The filtered I signal is mixed with a carrier frequency signal obtained from local oscillator LO1. Accordingly, the filtered Q signal is mixed with the 90° phase shifted carrier signal. Both carrier frequency signals are combined in summing element 19, and the combined signal is firstly filtered in the band pass filter, then amplified in power amplifier 111. Finally, the amplified signal is fed to element 112 which combines the signal with those obtained from the other branches.

The arrangement for producing four carriers as shown in FIG.1 requires four pair of D/A-converters, four pair of low-pass filters, four analog I/Q modulators, four local oscillators (LO1, LO2, LO3, and LO4) and four power amplifiers.

FIG. 2 is a block diagram of another conventional QAM modulator. Here, modulation is carried out digitally. Sine and cosine intermediate frequency signals are generated by a numerically controlled oscillator 21. Input to the oscillator is "carrier frequency" which is a frequency control word. The phase value is generated by using the modulo $2^j$ overflowing property of a j-bit phase accumulator. The phase accumulator addresses the sine/cosine Read Only Memories (ROMs) which convert phase information into values of a sine/cosine wave. Phase accumulator 22 controls sine and cosine read only memories 23, 24 to output digital sine ($\omega_{NCO}$) and cosine($\omega_{NCO}$) signals. The cosine intermediate frequency signal is multiplied with the I data which is before multiplying filtered both in root raised cosine filter 25 and interpolation filters 26. The root raised cosine filter reduces the transmitted bandwidth, which means that more channels can be occupied in the frequency band. Furthermore, after this filter the signal fulfils the Nyquist criterion (no intersymbol interference). Accordingly, the sine signal is multiplied with the Q data which is before multiplying filtered both in root raised sine filter 27 and interpolation filters 28. Then the modulated sine and cosine intermediate frequency signals are combined in combiner 29. Note, that instead of the numerically controlled oscillator 21, direct digital synthesis DDS may be used as well.

The output of the modulator in FIG. 2 is:

$$s(n)=I(n)\cos(\omega_{NCO}t(n))+Q(n)\sin(\omega_{NCO}t(n)) \quad (1)$$

where $\omega_{NCO}$ is the output frequency of the numerically controlled oscillator, and I(n), Q(n) are pulse shaped and interpolated quadrature data symbols.

The pre-equalizer could be used to compensate for the sinx/x roll-off function inherent in the sampling process of the digital-to-analog conversion. Furthermore, distortions in the phase and magnitude of response of the analog filters could be partly pre-compensated by the pre-equalizer. The analysis and compensation of the distortions from analog filters are left out of the scope of this paper FIG. 3 is a table containing specifications for a base station transmitter in the European WCDMA system. As seen from the table, four carries are used with carrier spacing 5 MHz.

FIG. 4 is another way to build a conventional QAM modulator with complex outputs. In comparison with the modulator of FIG. 2, this modulator uses two additional multipliers and one additional adder to produce both I and Q output signals, which are:

$$I_{OUT}=I(n)\cos(\omega_{NCO}t(n))+Q(n)\sin(\omega_{NCO}t(n)),$$

$$Q_{OUT}=Q(n)\cos(\omega_{NCO}t(n))-I(n)\sin(\omega_{NCO}t(n)),$$

This structure requires two adders, four multipliers, and sine/cosine memories.

A drawback of the analog multicarrier modulator is the need of huge amount of analog components. In addition, many of them require production tuning including complexities of adjusting the dc offset, the phasing, and the amplitude levels between the in-phase and quadrature phase. Tuning is an expensive part of manufacturing. Furthermore, the analog I-Q modulator causes most of error vector magnitude (EVM) in the conventional systems. The EVM is defined as the difference between ideal vector convergence point and transmitted point in the signal space. EVM is defined as r.m.s. value of the error vectors in relation to the magnitude at a given symbol A drawback of the conventional digital QAM modulators are that they need several multipliers and sine/cosine ROMs, which cannot be efficiently implemented with field programmable gate arrays (FPGA).

SUMMARY OF THE INVENTION

An objective of the present invention is to provide a digital QAM modulator without need of multipliers and sine/cosine memories and which is easy to implement with field programmable gate arrays.

The objective is achieved by replacing the circuitry which carries out the circular rotation of [I(n), Q(n)]T performed in all the QAM modulators, with a CORDIC algorithm. Said algorithm is an iterative algorithm for computing many elementary functions.

The invented CORDIC based QAM modulator is comprised of a plurality of digital rotation stages coupled in sequence. The first stage receives the $I_{IN}$ and $Q_{IN}$ data streams and the last stage outputs a vector comprising of the orthogonal I and Q components of a digital intermediate frequency signal. Each of the rotation stages includes pipeline registers and adding/subtracting elements for rotating an input vector applied to the stage at a predetermined elementary rotation angle, said input vector being the output vector of the previous digital rotation stage.

The modulator further includes an angle computation block for counting the elementary rotation angles for the rotation stages. The angle computation block is connected to the phase accumulator which receives a frequency control word and based on that word generates an input word applied to the angle computation block.

Implementation of the modulator consists an array of interconnected adder/subtractors. This structure is easy to pipeline, therefore the clock frequency requirement of the QAM modulator can be reached in FPGA design.

The invented multicarrier QAM modulator does not use an analog I/Q modulator, therefore, the difficulties of adjusting the dc offset, the phasing and the amplitude levels between the in-phase and quadrature phase signal paths are avoided.

The CORDIC based QAM modulator has about same logic complexity as the two multipliers and the adder with the same word sizes. The conventional QAM modulator with the quadrature outputs requires four multipliers, two adders and sine/cosine memories. If the QAM modulator with the quadrature outputs is needed, the CORDIC based QAM modulator replaces four multipliers, two adders and sine/cosine memories.

BRIEF DESCRIPTION OF THE DRAWINGS

The invention is described more closely with reference to the accompanying drawings, in which.

DETAILED DESCRIPTION OF THE INVENTION

Figure 5:
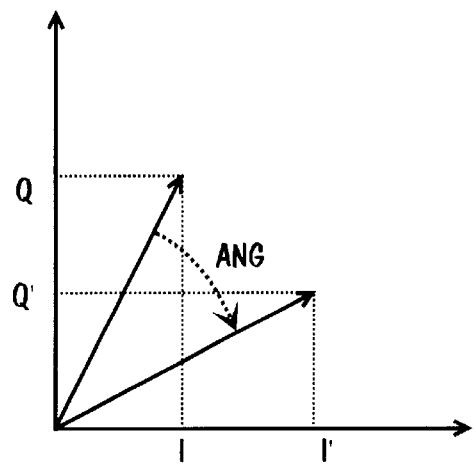
FIG. 5 illustrates the circular rotation performed by the modulator.

Main task of every QAM modulator is to perform a circular rotation of [I(n), Q(n)]T. This is illustrated in FIG. 5, in which the original vector is transformed by an angle denoted here ANG. Hence, the coordinates of the vector are changed from I and Q to I' and Q'. Mathematically this can be expressed:

$$I'=I \cdot \cos(ANG)+Q \cdot \sin(ANG) \qquad (2)$$

$$Q'=Q \cdot \cos(ANG)-I \cdot \sin(ANG)$$

Instead of using a plurality of multipliers and sine/cosine memories as in prior art modulators the circular rotation is implemented by using a CORDIC algorithm. Said algorithm is described in the reference J. E. Volder, "The CORDIC Trigonometric Computing Technique," IRE Trans. on Electron. Comput., Vol. EC-8, No. 3, pp. 330–334, September 1959.

The CORDIC (Coordinate Rotation Digital Computer) computing technique was developed especially for use in a real-time digital computer where the majority of the computation involved the discontinuous, programmed solution of the trigonometric relationships of navigation equations and a high solution rate for the trigonometric relationships of coordinate transformations. It is a special purpose digital computer for real-time airborne computation. In the algorithm a sequence of conditional additions and subtractions are used. The coordinate components of a vector and an angle of rotation are given and the coordinate components of the original vector, after rotation through the given angle, are computed.

Hence, the circular rotation can be implemented efficiently using the CORDIC algorithm, which is an iterative algorithm for computing many elementary functions. In the receiver, the CORDIC-based digital demodulator could be used as explained later.

The invented CORDIC based QAM modulator is an array of interconnected adder/subtractors. So it can be realized with basic logic structure in existing FPGAs. Preferably, it is meant the logic structures that correspond to Configurable Logic Blocks (CLBs) for Xilinx® XC4000 family and Logic Elements (LEs) for the Altera's® FLEK devices in particular. A conventional QAM modulator needs two (four) multipliers and sine/cosine ROMs, which cannot be efficiently realized with the basic logic structures.

Figure 6:
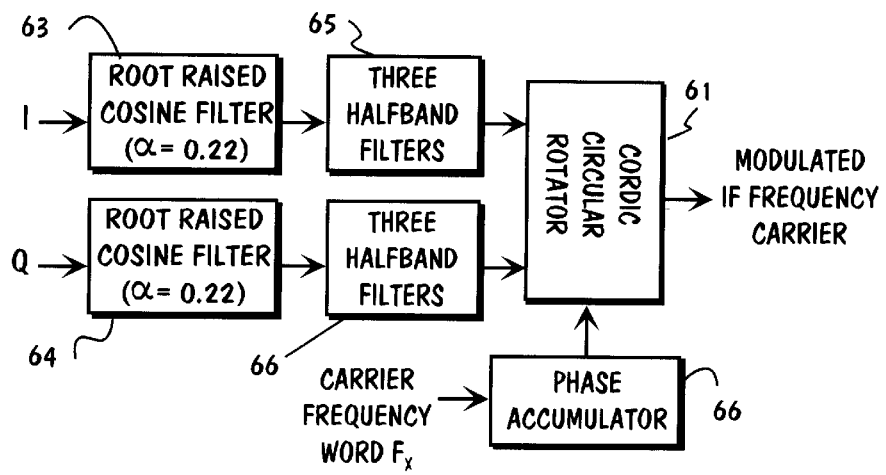
FIG. 6 is a block diagram of the invented modulator.

FIG. 6 is a schematic block diagram of the invented QAM modulator. As inputs to the modulator are digital I and Q signals which are filtered first in root raised cosine filters 63, 64 and then in three half band filters 65, 66. The modulator produces a modulated carrier having an intermediate frequency. The carrier frequency is formed by phase accumulator 62 in accordance with word "Carrier Frequency" applied thereto. It is worth to note that the modulated carrier is in digital domain.

Figures 2, 3:
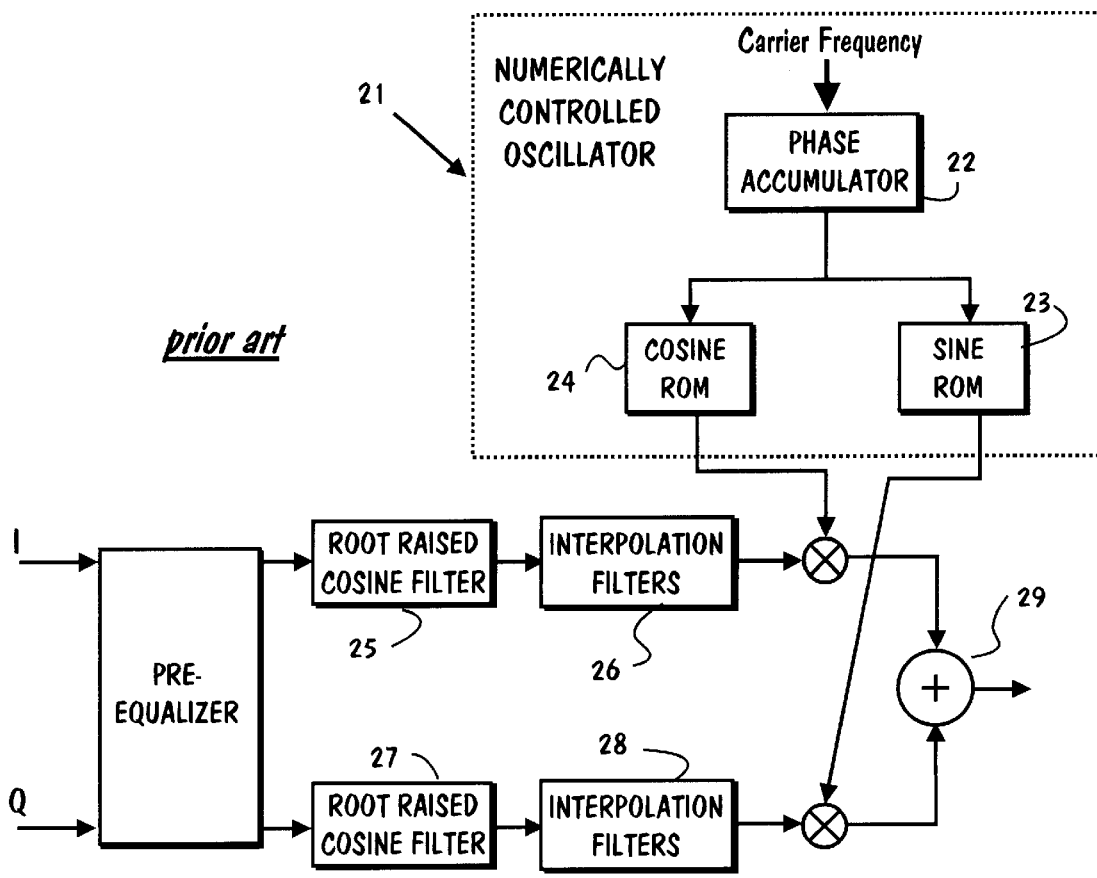
FIG. 2 is a schematic block diagram of a digital QAM modulator.
FIG. 3 is a table of WCDMA base station transmitter specifications
Figure 4:
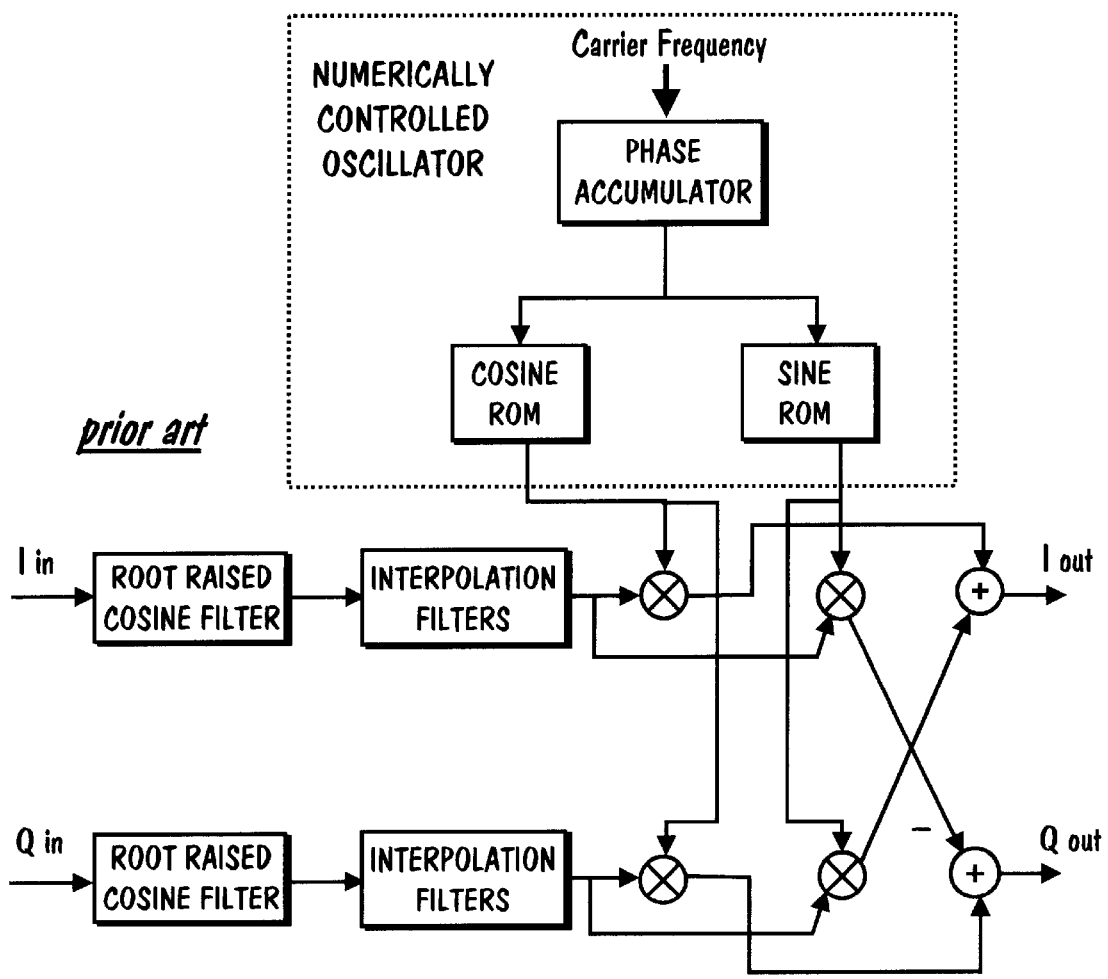
FIG. 4 is a schematic block diagram of another digital QAM modulator.

In comparison to the modulator in FIG. 2, a basic distinction is that the sine and cosine memories and multipliers are substituted with the Cordic circular rotator 61. Operation of the rotator and also designs of the root raised cosine filters 63, 64 and the halfband filters 65,66 is now described in detail.

The invented QAM modulator is implemented by taking I' term (in-phase), see FIG. 5, at the CORDIC circular rotator output. If both the in-phase and quadrature phase are needed, both I' and Q' are taken at the CORDIC circular rotator output. In the multicarrier QAM modulator described in this embodiment, only the in-phase is required.

The previously mentioned equations (2) can be rearranged as follows:

$$I'=\cos(ANG)\cdot[I+Q\cdot\tan(ANG)] \quad (3)$$

$$Q'=\cos(ANG)\cdot[Q-I\cdot\tan(ANG)] \quad (3)$$

Arbitrary angles of rotation are obtainable by performing a series of successively smaller elementary rotations. The rotation angles are restricted so that $\tan(Ang_i)=\pm 2^{-i}$, the multiplication by the tangent term is reduced to binary shift operations. The iterative rotation can now be expressed according to equations (4):

$$I_{I+1}K_i[I_i+Q_i d_i 2^{-i}]$$
$$Q_{I+1}K_i[Q_i+I_i d_i 2^{-i}] \quad (4)$$
$$K_i=\cos(\tan^{-1}(2^{-i}))$$

where $d_i=-1$ if $z_i<0$ and otherwise $d_i=+1$.

In rotation, third variable z, which is a phase value, is iterated to zero, $$z_{i+1}=z_i-d_i\tan^{-1}(2^{-i}) \quad (5)$$

While the inverse tangent of 2° is only 45°, the circular rotator must accommodate angles as large as ±180°. Therefore the initialization cycle, which performs ±90° rotation, is added, equations (6)

$$I_0=Q_{in}d$$
$$Q_0=I_{in}d \quad (6)$$
$$z_0=z_{in}-2d\tan^{-1}(2^{-i})$$

where d=1 if $z_{in}<0$, otherwise d=-1.

Removing scale constant $K_i$ from the iterative equations (5) yields a shift-add algorithm for vector rotation. That product approaches 0.6073 as the number of iterations goes to infinity. Therefore, the CORDIC rotation algorithm has a gain of approximately 1.647. If the both vector components inputs are allowed to go to the full scale simultaneously, the magnitude of the result vector is 1.414 times the full scale. The CORDIC rotator has a gain approximately 1.647, which when combined with the maximum vector magnitude yields a maximum output of 2.33 times of the full scale input. The CORDIC rotator would require 2 'guard' bits to accommodate the maximum growth without overflowing. The last halfband filter coefficients of three filters 64, 65, could be scaled so that only one guard bit is required.

Figure 7:
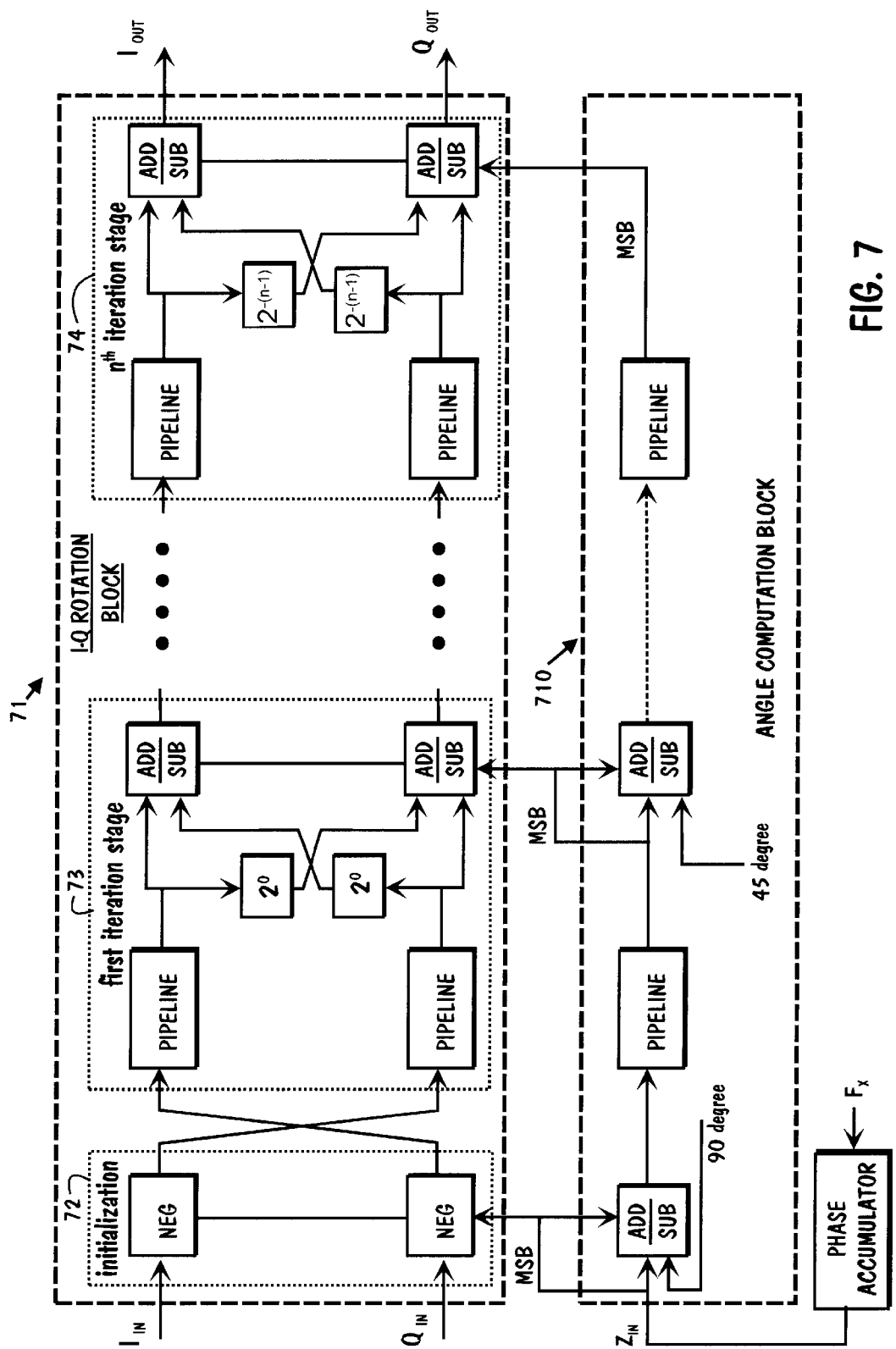
FIG. 7 is a schematic block diagram of the CORDIC circular rotator.

A block diagram in FIG. 7 shows an implementation of the CORDIC circular rotator 61 of FIG. 6. To implement the CORDIC rotator, only pipeline registers, adder/subtractors, and binary shifters are used, which can be implemented by wiring. In the case of most FGPA architectures there are already registers present in each logic cell, so the addition of the pipeline registers does not increase hardware cost.

The CORDIC rotator is divided into two main blocks. First main block 71 is a I-Q rotation block and second main block 710 is a angle computation block. The main blocks carry out operations according to equations (4), (5), and (6).

The I-Q rotation block comprises a plurality of sub-blocks. First sub-block 72 performs initialization, i.e. ±90° rotation, according to the equation (6). Thereafter the I-Q signals are processed in successive iteration stages from which first iteration stage 73 and last iteration stage 74 are shown only. Each of the iteration stages performs operations according to equation (4).

In summary, the first rotation angle is $\pm\pi/2$ and the rest of rotation angles are $\tan^{-1}(2^{-i})$, where i is the order of the stage. So, the second rotation angle is $\pi/4$ (45°), the third angle is 26.5650, the fourth angle is 14,030, the fifth angle is 7,125°, the sixth angle is 3.5763°, and so on.

The amount of the residual angle becomes smaller in successive iteration stages, therefore the word length in the angle computation block can be reduced approximately by one bit after each iteration stage. In order to minimize the wiring expense for shift operations between two stages, both data paths for I and Q are bit-by-bit interleaved with one another.

The angle computation block 710 performs operations according to equation (5).

CORDIC is a bit-recursive algorithm, which means that each iteration increases the accuracy of the results approximately by one bit. Also the truncation due to the finite precision in fixed-point arithmetic causes errors. The simulation results indicate that 11 iteration stages plus the initialization cycle are required to meet requirements set for the European WCDMA system by European Telecommunications Standards Institute (ETSI). Errors caused by truncation require 14 bit precision in the angle computation data path and 16 bit precision in I and Q data paths.

Now, requirements set to the phase accumulator are explained. The input word $F_X$ (frequency control word to the phase accumulator), see FIG. 6, controls the frequency of the generated QAM modulated signal. The phase value is generated by using the modulo $2^j$ overflowing property of a j-bit phase accumulator. The rate of the overflow is the output frequency which can be expressed with equation (7):

$$f_{out}=(F_X f_{clk})/2^j \quad (7)$$

where
$F_X$=the frequency control word,
j=the phase accumulator word length,
$f_{clk}$=the clock frequency,
$f_{out}$=the output frequency.

The frequency control word $F_X$ in the equation is an integer, therefore the frequency resolution $\Delta f$ is found by setting $F_X=1$, wherein $$\Delta f=f_{clk}/2^j \quad (8)$$

The frequency resolution using equation (8) will be 3.9 Hz by when $f_{clk}$ is 65.536 MHz, and j is 24. The frequency resolution is much below the frequency error as that defined for the WCDMA system by ETSI, see table in FIG. 3. The output $Z_{IN}$ of the phase accumulator is address to the CORDIC circular rotator as shown in FIG. 7.

Figure 8:
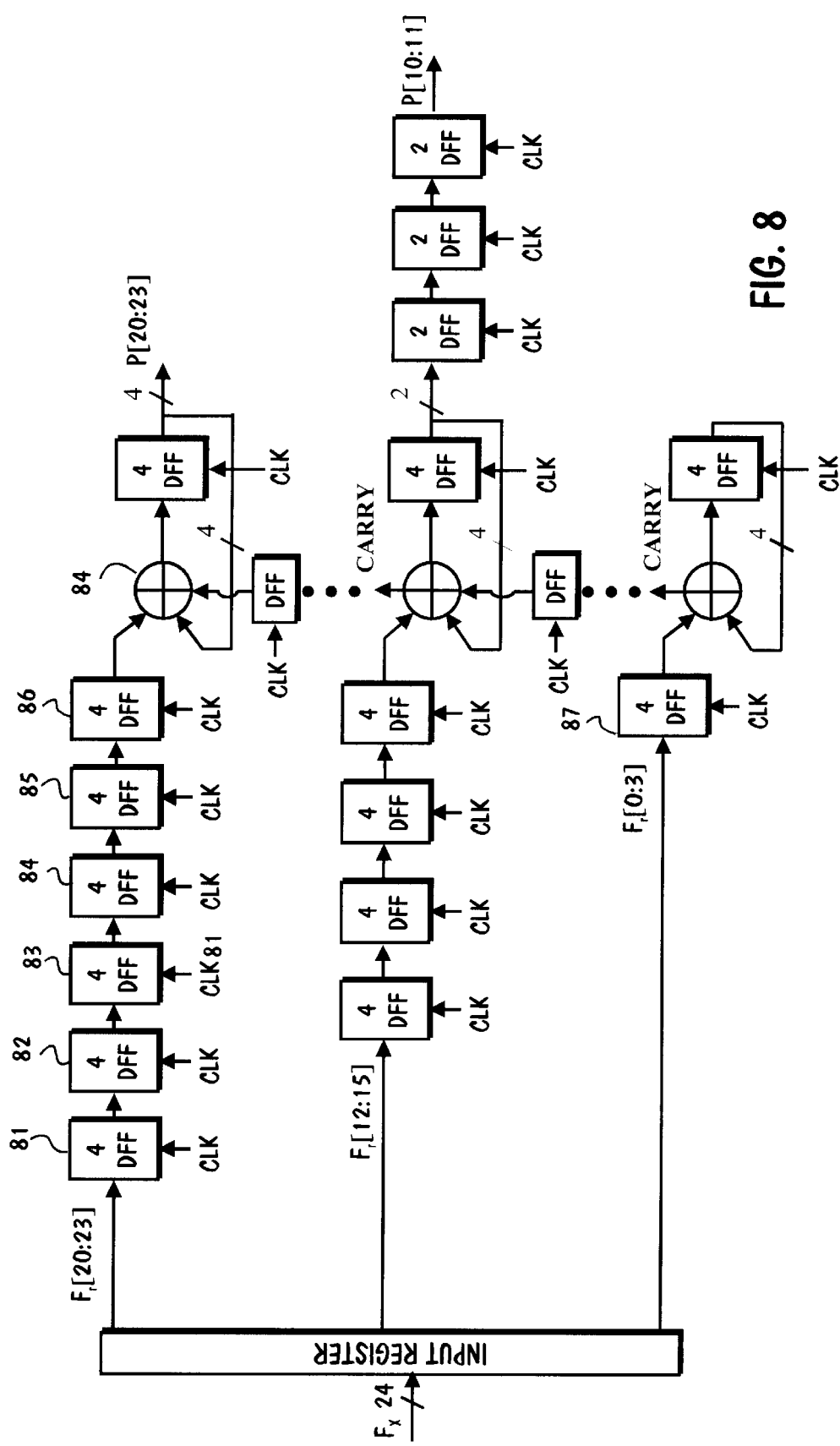
FIG. 8 is a block diagram of the phase accumulator.

FIG. 8 depicts one solution to implement the phase accumulator generating input signal $Z_{in}$ to the angle computation block. In practice the phase accumulator circuit cannot complete the 24-bit addition in a short single clock period because of the delay caused by the carry bits propagating through the adder. In order to enhance the operation to higher clock frequencies, one solution is a pipelined accumulator as shown in FIG. 8. The phase accumulator includes an input register, a plurality of parallel pipeline branches comprising of D flip flops each with word length of 4 bits. Pipelines delay bits so that high order bits are delayed more than low order bits. In FIG. 8, highest order bits are delayed by six flip flops 81, 82, 83, 84, 85, 86, whereas the lowest order bits are delayed only by one D flip lop 87. To maintain the valid accumulator phase during the frequency control word transition, the new frequency control word is moved into the pipeline through the delay circuit. Number of the D flip flop branches corresponds to input word length $F_X$.

To reduce the number of gate delays, a kernel 4-bit adder is used and the carry is latched between successive adder stages. The 4 bit adder of the upper branch is denoted with numeral 84 in FIG. 8. In this way the length of the accumulator does not reduce the maximum operating speed. However, the penalty is that the tuning latency increases. The D-flip-flop (DFF) circuits in the input delay equalization demand substantial circuit area and power, and would impact the loading of the clock distribution network.

Frequency control word $F_X$ to the phase accumulator controls the frequency of the generated QAM modulated signal. The digital input phase increment is added to the previous phase accumulator value. At each clock pulse CLK this data is added to the previous phase accumulator value. The phase increment word represents a phase angle step that is added to the previous value at each $1/f_{clk}$ seconds to produce a linearly increasing digital value. The phase value is generated by using the modulo $2^j$ overflowing property of a j-bit phase accumulator. The rate of the overflow is the output frequency $f_{out}$ in equation (7).

The output delay circuitry is essentially identical to the input delay equalization circuitry. It also comprises of D flip flops. In contrast to the input circuitry, the output circuitry is inverted so that the low order bits have a maximum delay while the most significant bits have the minimum delay. The 14 most significant phase bits are used to address the CORDIC rotator. Therefore only these 14 bits are delayed in FIG. 8.

A multicarrier modulator described previously with reference to FIGS. 6, 7, and 8 is very useful in a WCDMA system where more than one carrier is used. In the European WCDMA system, four QAM modulated carrier frequencies are needed to generate in a base station.

Figure 1:
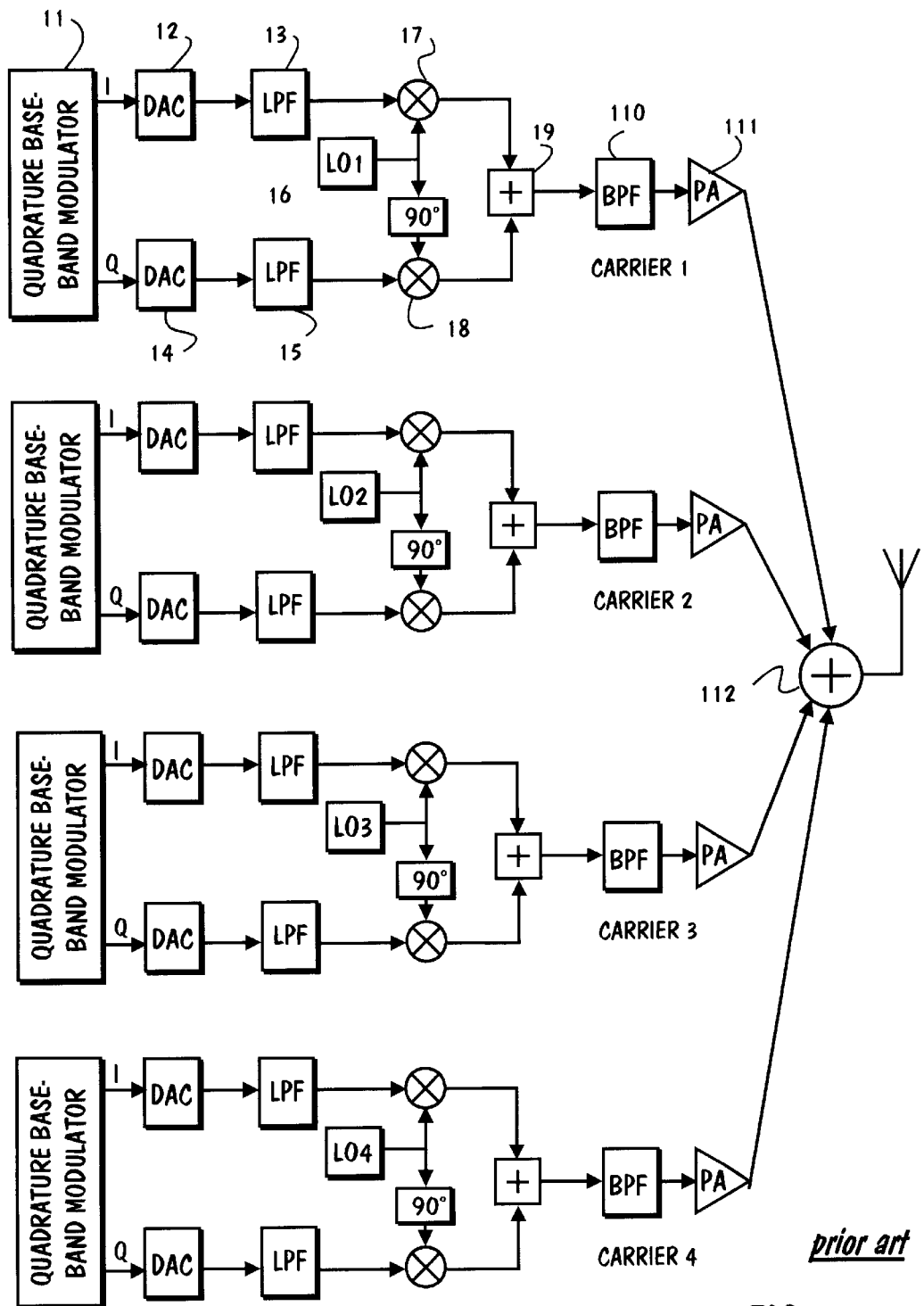
FIG. 1 shows an analog four channel QAM modulator.

A great advantage of the invented digital modulator in forming a multicarrier QAM modulator is that modulator outputs can be directly added in digital domain whereupon the sum signal is converted to an analog signal, amplified in a single power amplifier, and transmitted through an aerial. In the prior art multicarrier modulator, see FIG. 1, each carrier must be firstly separately amplified and thereafter summed to form a sum signal.

Figure 9:
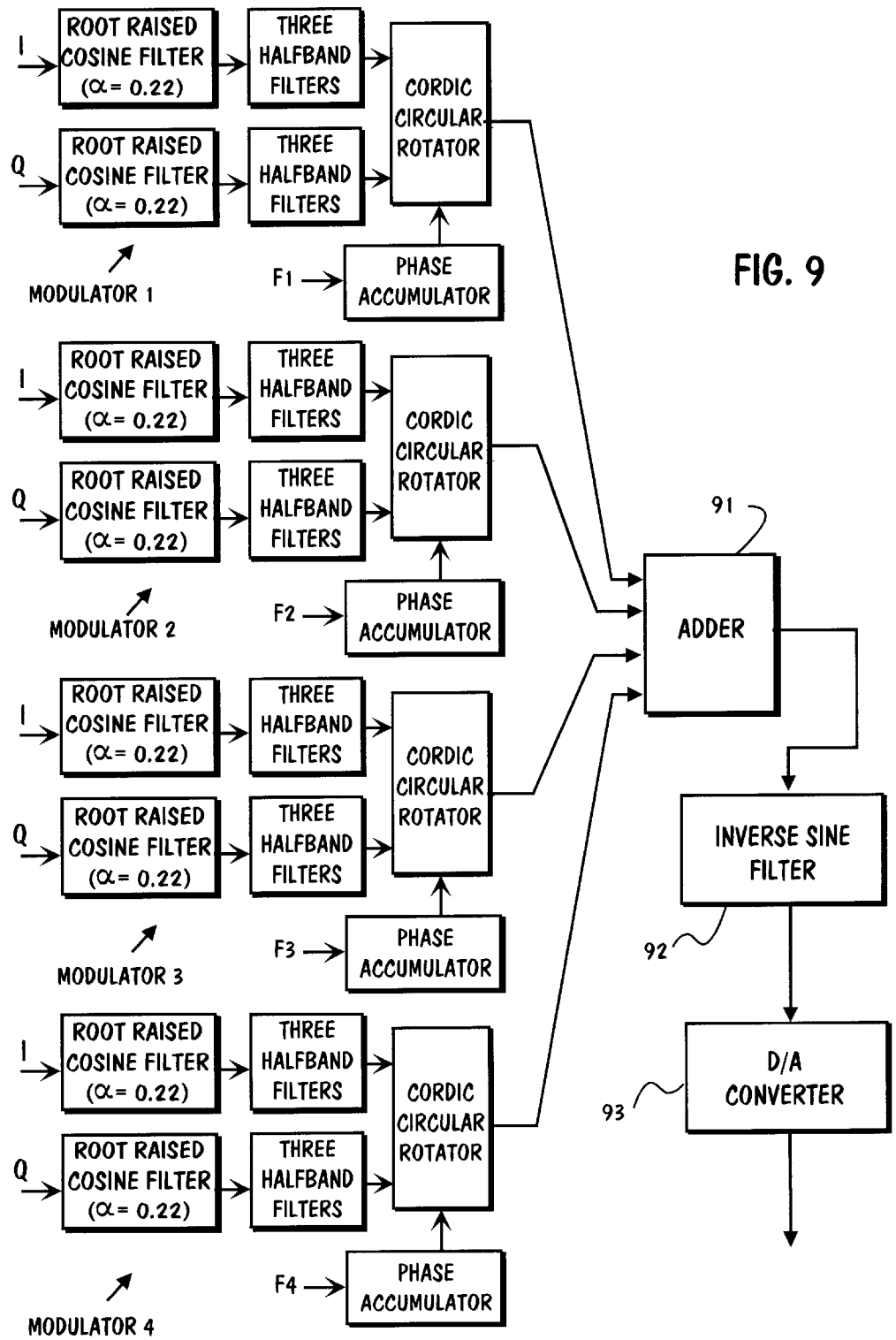
FIG. 9 shows a four channel QAM modulator.

FIG. 9 depicts a multicarrier QAM modulator assembled from four modulator. Modulator 1, Modulator 2, Modulator 3, and Modulator 4, each of them being according to the invention. Each modulator has its own carrier frequency word $F_X$ and input I/Q signals. The modulators translate the base-band signals directly to IF signal with the frequency between 5 and 25 MHz. Four modulated intermediate frequency carrier signals are so produced. The signals are in digital domain.

The modulated four signals are summed in adder 91. The multicarrier signal is then filtered by inverse sinc filter 92 to compensate for the sinX/X rolloff function inherent in the sampling process of digital-to-analog conversion made in D/A converter 93. Another method to compensate the sinx/x roll-off is to use the pre-equalizer (see FIG. 2). A drawback of this method is that four complex equalizers in this multicarrier QAM modulator are required.

Figure 10:
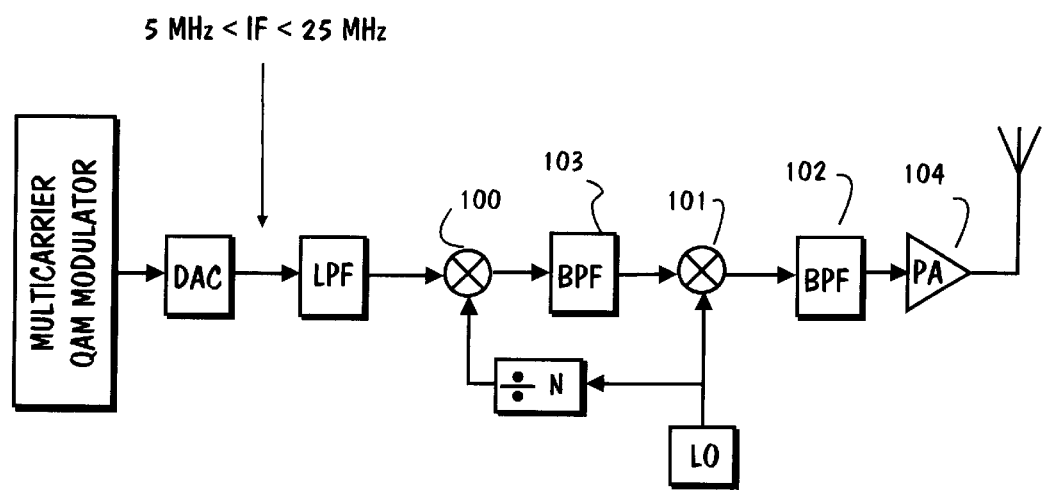
FIG. 10 illustrates up conversion of the QAM modulated signal.

The analog IF signal is up converted by two mixers and bandpass filters to a radio frequency signal as shown in FIG. 10.

FIG. 10 depicts processing of the digital sum signal which has been obtained by adding the modulated four carriers produced by the digital modulators of FIG. 9. The modulated IF sum signal is converted first into an analogue signal with a frequency between 5 MHz and 25 MHz, then the obtained analog signal is up converted to a radio frequency by two mixers, 100, 101, and two bandpass filters (BPF), 103 and 102. Finally, the signal is amplified in power amplifier 104. Frequency of local oscillator LO is fixed but frequencies of the four carriers can be independently adjusted digitally in the modulators.

Still referring to FIG. 9, operation of inverse SINX/X filter 92 is described in more detail. Digital-to-Analog converters exhibit a fully sampled-and-hold output signaling format that causes amplitude distortions on the spectrum of the converted analog signals. This corresponds to a lowpass filtering function expressed as:

$$|H(f)|=|\sin c(\pi f/f_{CLK})| \qquad (9)$$

where $f_{CLK}$ is the clock frequency of the multicarrier QAM modulator.

In the multicarrier QAM modulator output band is from 5 MHz to 25 MHz, this introduces a droop of −2.1755 dB. In the WCDMA system, this is not acceptable. Therefore the droop is compensated with inverse sinx/x filter 92. The inverse sinc-filter is designed so that the frequency bands (0–5 MHz and 25–32.8 MHz) are defined as don't care bands. Attempting to compensate the distortion over the entire Nyquist bandwidth required significantly longer filters. Design of the inverse sinc filter is known to a man skilled in the art.

Figure 12:
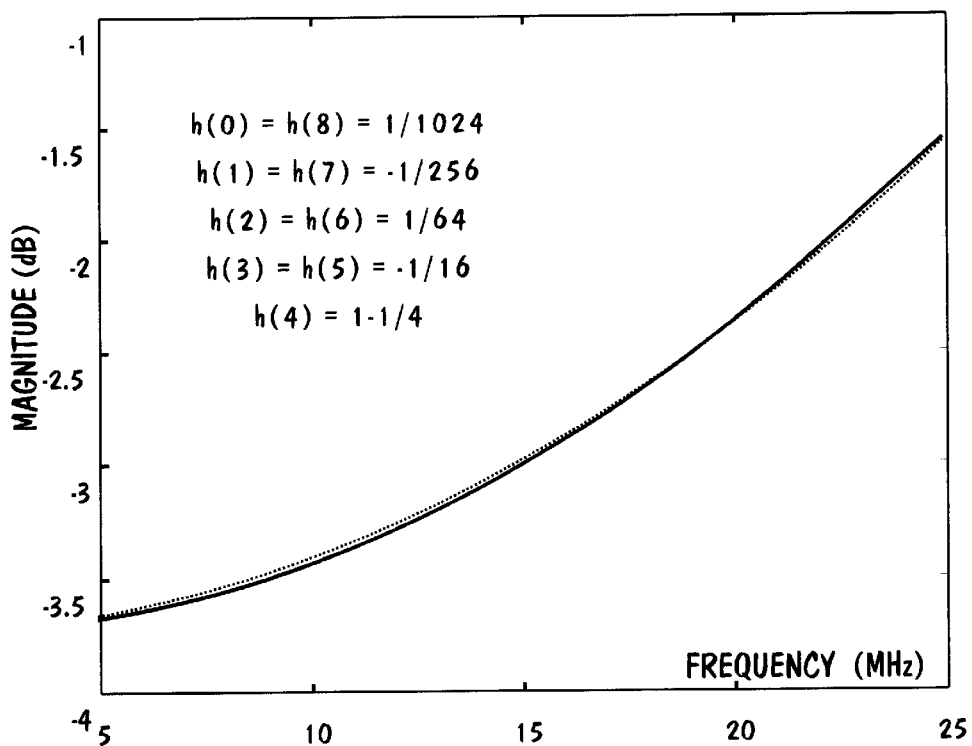
FIG. 12 shows frequency response of the FIR compensation filter.

FIG. 12 shows the impulse response coefficients and the frequency response of the compensation filter. The dotted line is the curve of the ideal filter. The peak error is ±0.0274 dB over the frequency band from 5 MHz through 25 MHz.

Figure 11:
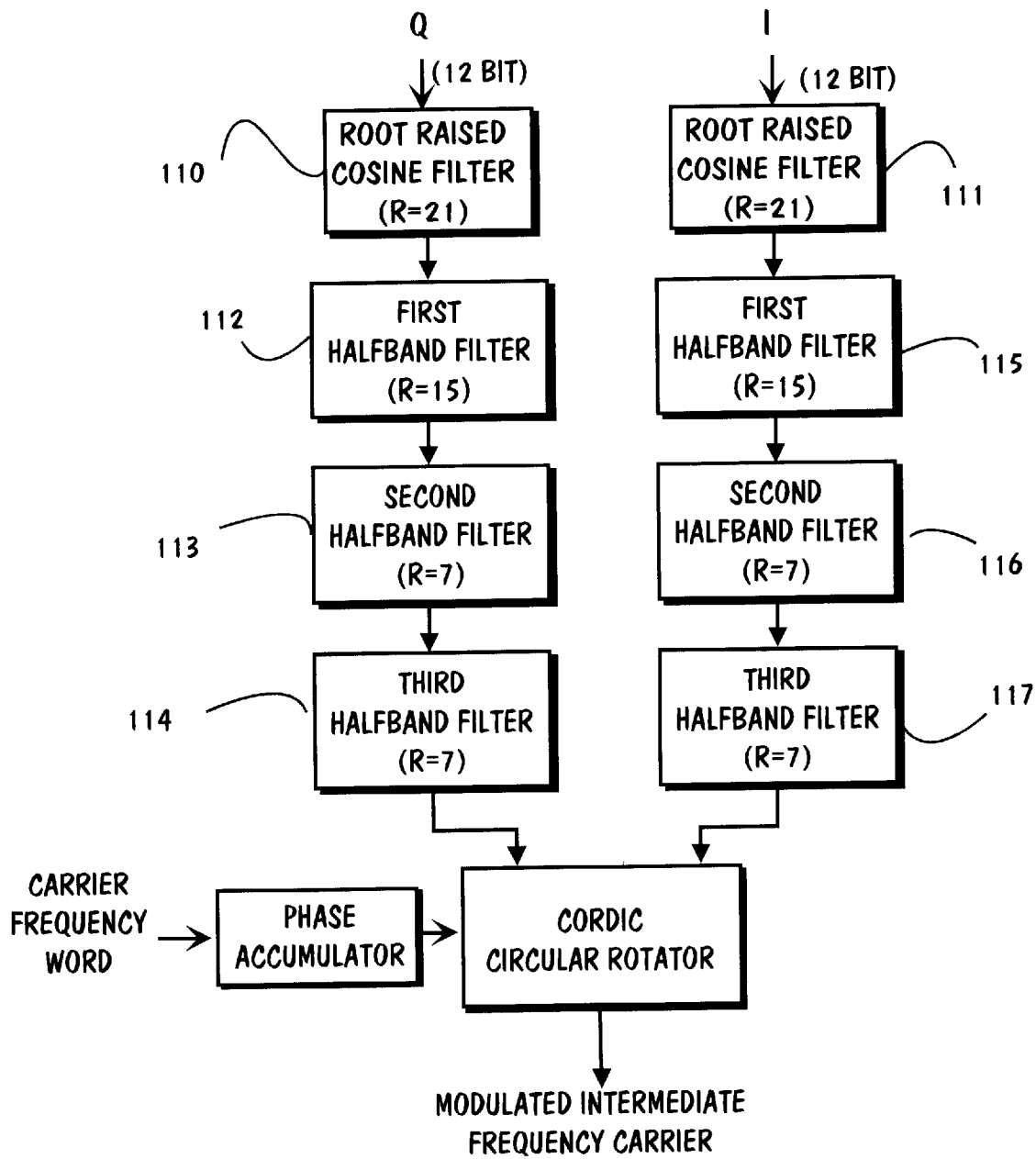
FIG. 11 depicts filters of the QAM modulator.

Next, design of filters which are used in the invented multicarrier modulator are explained. Reference is made to FIG. 11. The figure is basically the same as FIG. 6 but the filters are shown separately.

In the multicarrier QAM modulator, phase distortion cannot be tolerated, thus the filters are required to have a linear phase. It is well known that an FIR filter (Finite Impulse Response) can be guaranteed to have an exact linear phase response if the coefficients are either symmetric or asymmetric about center tap. Multirate systems are efficiently implemented using the polyphase structure in which sampling rate conversion and filtering operations are combined. It has been shown in the art that for a interpolation of M, a N-tap filter running at the higher of the sampling rates Fs, is equivalent to M N/M-tap subfilters running at Fs/M.

When the prototype filter is linear phase, however, the decomposition of the filter into M subfilters will usually result in nonlinear phase subfilters, and, thus, possibly increased complexity as compared to the prototype filter. Since the decomposition into subfilters is accomplished by sampling every Mth coefficient of the original impulse response, those subfilters resulting from sampling which is symmetric about the center tap will be linear phase, while the other subfilters will not. In fact, at most, two of the subfilters will be linear phase. Therefore, the root raised cosine filters (α=0.22) 110 and 111 in FIG. 11, are interpolating FIRs with a 1:2 interpolation ratio.

After I and Q signals have been filtered in cosine filters 110, 111, they both are filtered in three successive halfband filters 112, 113, 114; 115, 116, 117. Half band filters are filters whose passband and stopband have exact symmetry ¼ sampling frequency. In three halfband filters all but one of odd coefficients are zero, thereby reducing the hardware complexity by approximately 50%. This reduction, coupled with their symmetric impulse responses, allows first halfband filters 112, 115, second halfband filters 113, 116, and third halfband filters 114, 117 to be specified by only 5, 3, 3 nonzero coefficients, respectively. The magnitude response of the three half filters and root raised cosine ($\alpha$=0.22) filter are shown in FIG. 12. The combination of filters provides more than 60 dB image rejection.

Now, design of filter coefficients are explained. Root raised cosine filters ($\alpha$=0.22) 110, 111, are designed to maximize ratio of the main channel power to the adjacent channels leakage power under the constraint that the EVM (Error Vector Magnitude) is below 5%. Half-band filters can be designed with floating-point coefficients using a least-squares FIR design method. A least-squares stopband rather than an equiripple stopband is more desirable, because the objective is to maximize the ratio of the main channel power to the adjacent channels leakage power. An equiripple stopband minimizes the peak stopband amplitude, however, the total stopband energy is much larger than in a least squares design.

Figure 13:
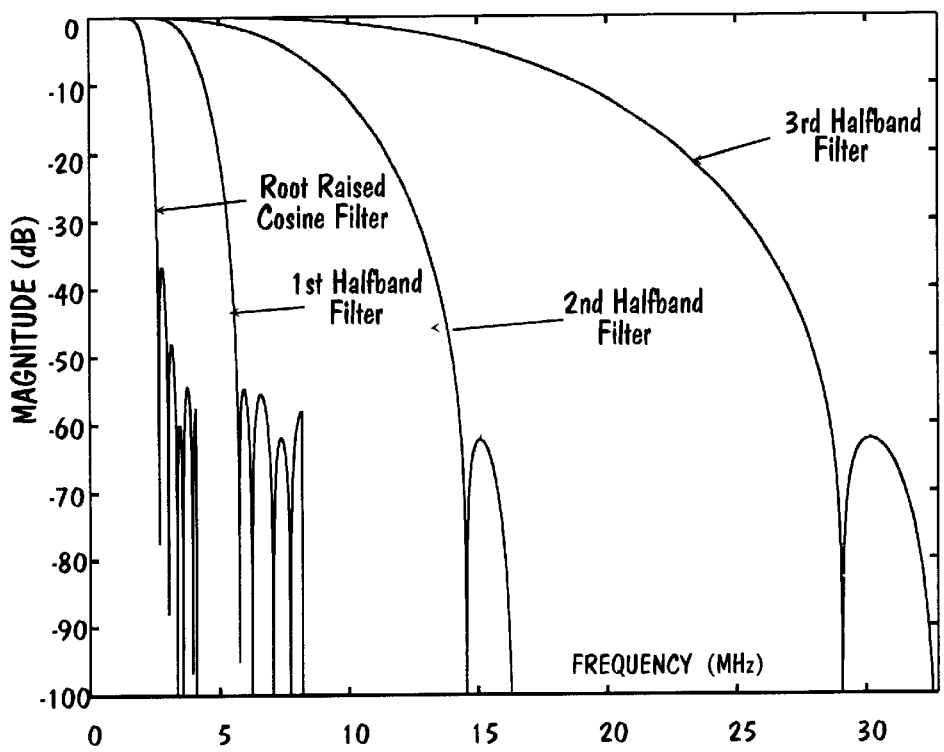
FIG. 13 shows frequency response of the half band filters and the root raised cosine filter.

FIG. 13 shows filter responses measured after each of the filters of FIG. 11.

As to multipliers of the FIR filters, for applications with fixed coefficients a fully parallel multiplier is not required, and would indeed be wasteful of area. Instead, multiplication by a fixed binary number can be accomplished with (N−1) adders, where N is the number of nonzero bits in the coefficient. A more efficient technique is to recode the coefficients from a binary code to a ternary Canonic Signed Digit (CSD) code containing the digits {−1, 0, 1}. Recoded in this way, a limited number of nonzero digits can be used to adequately represent the coefficients. The effect of quantizing the filter coefficients to a limited number of CSD digits is difficult to study analytically, so simulation is recommended in optimizing the chosen codes.

Finally, implementation of the invented OAM modulator by using field programmable gate arrays (FPGA) is shortly described.

The CORDIC based QAM modulator is an array of interconnected adder/subtractors. So it can be realized with basic logic structure in existing FPGAs. We mean the logic structures that correspond to Configurable Logic Blocks (CLBs) for Xilinx® XC4000 family and Logic Elements (LEs) for the Altera's® FLEK devices in particular. The CORDIC-based multicarrier QAM modulator was implemented with the Altera FLEK 10KA-1 series devices. The pair of root raised cosine and three half-band filters requires 3501 (70% of total) LEs in the EPF10K100A device. Said components are manufactured by Xilix®, Inc., U.S.A and Altera® Corp., U.S.A.

The CORDIC rotator and the phase accumulator require 1159 (23% of total) LEs in the EPF10K100A device. The inverse sinx/x filter and the adder require 255 (44% of total) LEs in the EPF10K10A device. The maximum operating frequency of the CORDIC-based multicarrier QAM modulator is 79.36 MHz, which is higher than the operating frequency (65.536 MHz). The multicarrier QAM modulator can be implemented with eight EPF10K100A and one EPF10K10A devices.

The two 14×14 b multipliers and the adder in the conventional QAM modulator require 1068 LEs in the EPF10K100A device. The operating frequency of the two multipliers and the adder is 65.536 MHz. The latency of this structure is 8 clock cycles. In this structure the multipliers require about 96% of the LEs. Those multipliers was implemented with the parameterized module, which is optimized for performance and density in FPGAs. However, a multiplier transferred gate-for-gate into a programmable logic device would be over twice as big as a multiplier optimized for programmable logic devices. The CORDIC rotator requires 1094 LEs in the EPF10K100A device. The CORDIC based QAM modulator has about same logic complexity as the two multipliers and the adder (1068 LEs) with the same word sizes. It replaces sine/cosine ROMs, two multipliers and the adder used in the prior art modulator of FIG. 2. The conventional QAM modulator with the quadrature outputs requires four multipliers, two adders and sine/cosine memories. If the QAM modulator with the quadrature outputs is needed, the CORDIC based QAM modulator replaces four multipliers, two adders and sine/cosine memories.

Function of the invented modulator was simulated in the WCDMA system. The modulation method was dual channel QPSK, where uplink Dedicated Physical Data Channel (DPDCH) and Dedicated Physical Control Channel (DPCCH) are mapped to the I and Q branches respectively. In the base station, the multiuser I/Q data is combined and weighted. Therefore the input of the I/Q branches is 12 bit.

In this WCDMA system, error vector magnitude (EVM) is specified to be less than 12.5% rms. A 5% r.m.s. EVM is assigned to the digital parts. The EVM is defined as the difference between ideal vector convergence point and transmitted point in the signal space. EVM is defined as r.m.s. value of the error vectors in relation to the magnitude at a given symbol:

EVM=((r.m.s. Error Magnitude/(Symbol Magnitude))×100%.

Figure 15:
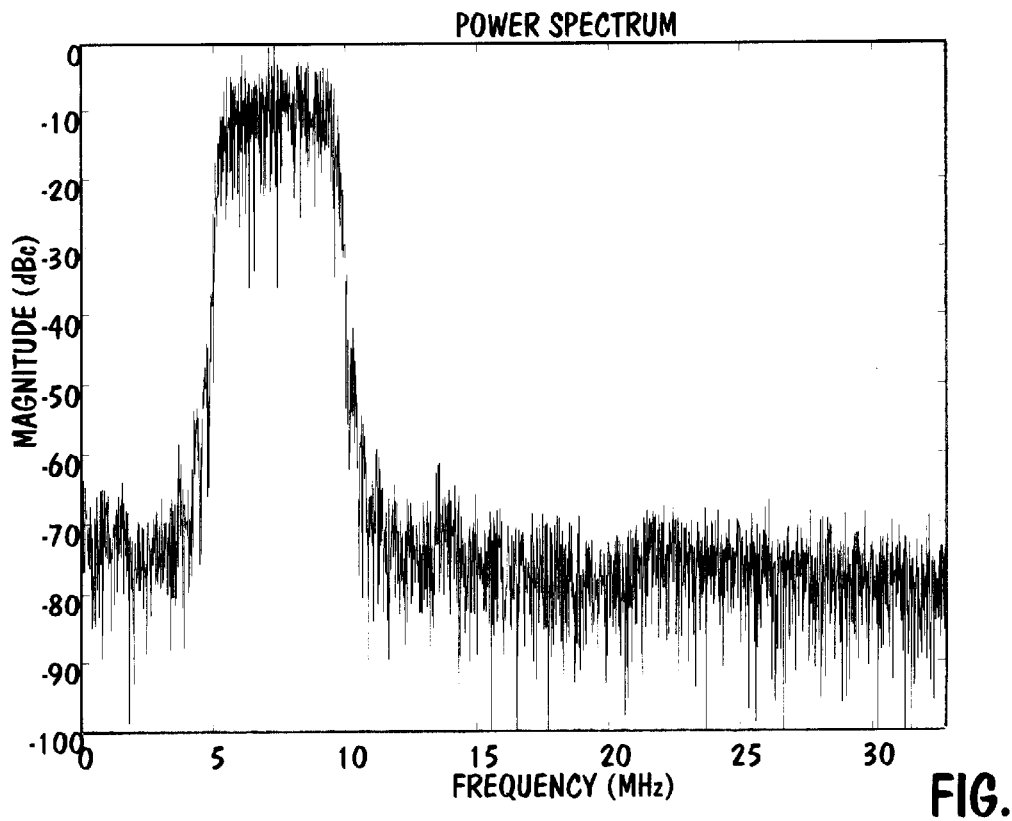
FIG. 15 depicts spectrum of one carrier QAM modulator.
Figure 16:
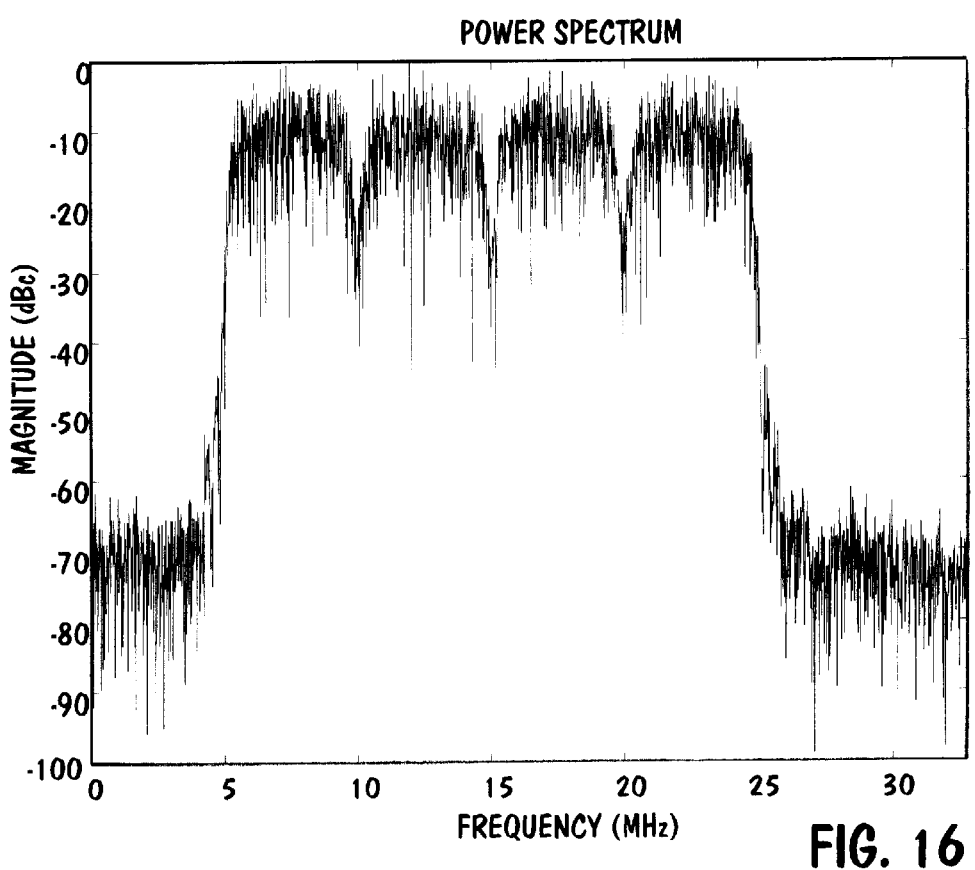
FIG. 16 depicts spectrum of four carrier QAM modulator.

FIGS. 15 and 16 show measurement results of the multicarrier QAM modulator outputs.

Figure 14:
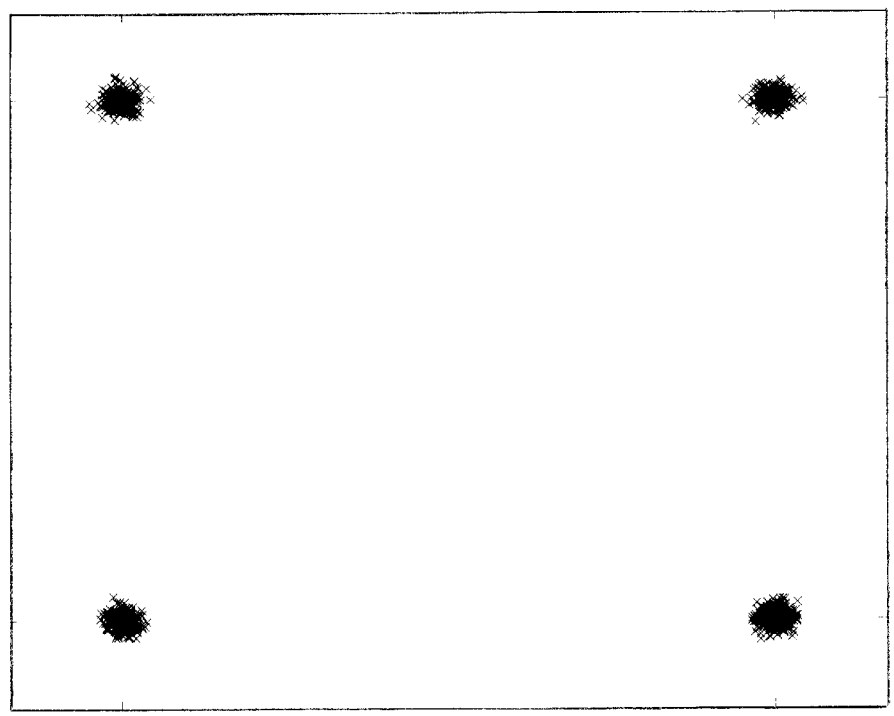
FIG. 14 illustrates the symbol constellation of the 4 QAM modulator.

One channel was transmitted (4 QAM), when the EVM was measured. The symbol magnitude was defined to be 40 dB below the maximum symbol level. This means that the symbol is 6–7 bits below the full scale input. The modulator output was directly connected to the ideal demodulator input. The 4 QAM symbol constellation is shown in FIG. 14 The simulated spectrum for one carrier is shown in FIG. 15 and FIG. 16 shows the multicarrier QAM modulator output.

Figure 17:
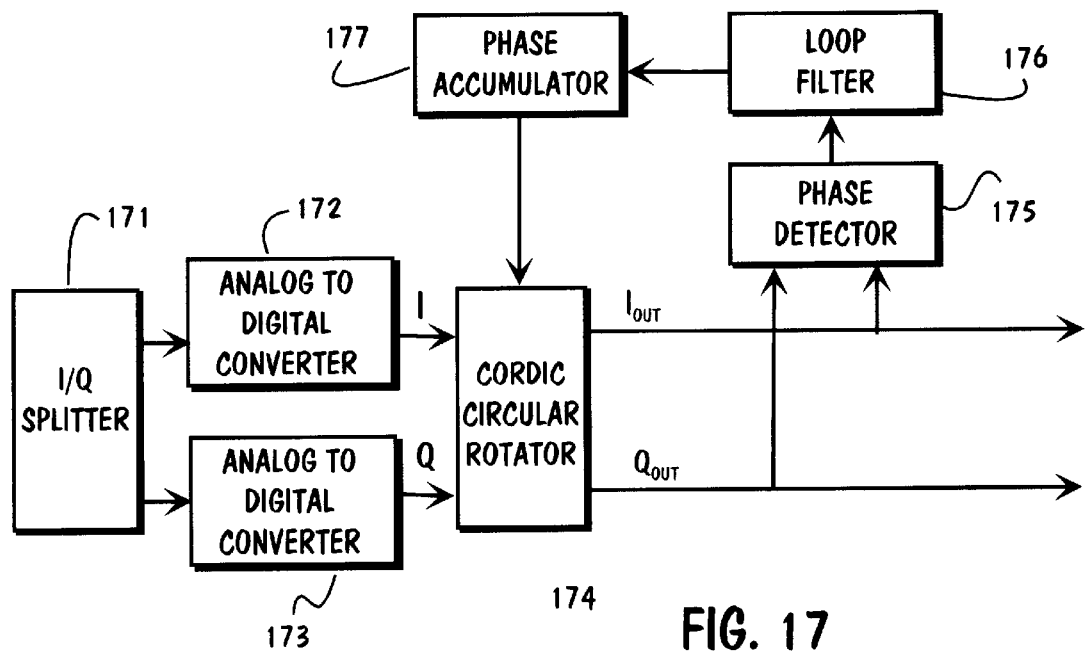
FIG. 17 is a block diagram of QAM demodulator.

A multicarrier demodulator which uses Cordic rotation can be implemented according to the teaching of the description above. The demodulator is depicted in FIG. 17. The received radio signal is first transferred to the intermediate frequency and thereafter I and Q intermediate frequency signals are formed in the I/Q splitter 171. Resulting analog I and Q signals are then converted into digital form in AD converters 172 and 173. The result is the intermediate frequency I and Q signal components. Said components are changed into I and Q data streams $I_{OUT}$ and $Q_{OUT}$ by using Cordic circular rotator 174 whose function is inverse in comparison with rotator of the modulator. The phase of the output signals are locked by using phase detector 175, the output signal of which is filtered before applying to phase accumulator 177.

However, the problem of the CORDIC structure is a long latency time, because the CORDIC algorithm is an iterative algorithm. This can cause a stability problem in the demodulator, since the demodulator has a feedback loop for the phase tracking. However, in the invented QAM modulator the long latency time is not a problem, because there is no feedback loop.

What is claimed is:

1. A vector modulator circuit for performing a circular rotation of a vector in accordance with a predetermined modulation scheme, the vector comprising of orthogonal I and Q components of a radio frequency signal to be transmitted, and formed from an $I_{IN}$ and $Q_{IN}$ data streams applied to the vector modulator circuit, wherein the vector modulator circuit comprises:

a plurality of digital rotation stages coupled in sequence, wherein the first stage receives the $I_{IN}$ and $Q_{IN}$ data streams and the last stage outputs a vector comprising of the orthogonal I and Q components of a digital intermediate frequency signal;

a plurality of pipeline registers and adding/subtracting elements for forming each of the digital rotation stages, each stage rotating an input vector by an individual elementary angle, said input vector being the output vector of the previous digital rotation stage;

an angle computation block for counting a plurality of individual elementary rotation angles, each of the angles being applied to one of the rotation stages; and a phase accumulator for receiving a frequency control word and for generating at an intermediate frequency input word $Z_{IN}$ for applying to the angle computation block.

2. A vector modulator circuit as claimed in claim 1, wherein the $i^{th}$ rotation stage rotates the input vector by an angle according to the following relationship:

$$angle_i = \tan^{-1}(2^{-i}).$$

3. A vector modulator circuit as in claim 1, wherein the first rotation stage outputs vector $I_0$, $Q_0$ by rotating input vector $I_N$, $Q_N$ by angle $\pm\pi/2$ according to the following relationship:

$$I_0 = Q_{IN} d$$

$$Q_0 = I_{ND} d$$

where $d=-1$ if input word $Z_{IN}<0$, otherwise $d=+1$.

4. A vector modulator circuit as claimed in claim 1, wherein the angle computation block counts for the first digital rotation stage a phase value difference by subtracting the individual elementary rotation angle value used in this stage from input word $Z_{IN}$ according to the following relationship:

$$z_0 = z_{IN} - 2d \tan^{-1}(2^{-i})$$

where $d=-1$ if input word $Z_{IN}<0$, otherwise $d=+1$.

5. A vector modulator circuit as claimed in claim 4, wherein the angle computation block counts for digital rotation stages I+1 a phase value difference by subtracting the individual elementary rotation angle value used in this stage from phase value difference $Z_i$ calculated in previous stage i according to the following relationship:

$$z_{i+1} = z_i - 2d_i \tan^{-1}(2^{-i})$$

where $d_i=-1$ if $z^i<0$ and otherwise $d_i=1$.

6. A vector modulator circuit as in claim 5, wherein $(i+1)^{th}$ digital rotation stage rotates the input vector $I_i$, $Q_i$, obtained from the previous stage i in accordance with the following relationship:

$$I_{i+1} = K_i[I_i + Q_i d_i 2^{-i}]$$

$$Q_{i+1} = K_i[Q_i - I_i d_i 2^{-i}]$$

$$K_i = \cos(\tan^{-1}(2^{-i}))$$

where $d_i=1$ if $z_i<0$ and otherwise $d_i=+1$.

7. A vector modulator circuit as in claim 1, wherein the accumulator is a j-bit phase accumulator and intermediate frequency input word $Z_{IN}$ is generated by using the modulo $2^j$ overflowing property of said accumulator, wherein output frequency $f_{out}$ is according to the following equation:

$$f_{out} = (F_x f_{clk})/2^j$$

where Fx=the frequency control word, j=the phase accumulator word length, $f_{clk}$=the clock frequency.

8. A multicarrier transmitter for generating a plurality of modulated carriers, comprising:

a plurality of digital elementary modulators each modulating one of the carriers in response to $I_{IN}$ and $Q_{IN}$ data streams applied to the elementary modulator, means for combining the modulated carriers for transmission through an antennae, wherein each of the digital elementary modulators comprises:

a plurality of digital rotation stages coupled in sequence, wherein the first stage receives the $I_{IN}$ and $Q_{IN}$ data streams and the last stage outputs a vector comprising of the orthogonal I and Q components of a digital intermediate frequency signal;

a plurality of pipeline registers and adding/subtracting elements for forming each of the digital rotation stages, each stage rotating an input vector by an individual elementary angle, said input vector being the output vector of the previous digital rotation stage;

an angle computation block for counting a plurality of individual elementary rotation angles, each of the angles being applied to one of the rotation stages; and a phase accumulator for receiving a frequency control word which determines the output frequency of the elementary modulator, and for generating at an intermediate frequency input word $Z_{IN}$ for applying to the angle computation block.

9. A multicarrier transmission as in claim 8, further comprising an adder for adding the digital intermediate frequency signals produced by the digital elementary modulators, and for producing a digital intermediate frequency sum signal.

10. A multicarrier transmitter as in claim 9, further comprising a digital to analog converter for converting the digital sum to an analog intermediate frequency sum signal.

11. A multicarrier transmitter as in claim 9, further comprising:

means for converting the analog intermediate frequency sum signal to a radio frequency signal, and an amplifier for amplifying the radio frequency signal.

* * * * *